(12) United States Patent
Young

(10) Patent No.: US 7,722,796 B1
(45) Date of Patent: May 25, 2010

(54) FABRICATION OF SMALL DIAMETER CONTINUOUS FIBERS

(75) Inventor: Henry D. Young, Dayton, OH (US)

(73) Assignee: Wright State University, Dayton, OH (US)

( * ) Notice: Subject to any disclaimer, the term of this patent is extended or adjusted under 35 U.S.C. 154(b) by 918 days.

(21) Appl. No.: 11/516,539

(22) Filed: Sep. 6, 2006

Related U.S. Application Data

(63) Continuation-in-part of application No. 11/462,579, filed on Aug. 4, 2006, now abandoned.

(60) Provisional application No. 60/705,743, filed on Aug. 5, 2005.

(51) Int. Cl.
*D01D 5/00* (2006.01)
*D01D 5/14* (2006.01)

(52) U.S. Cl. .................................................. 264/562

(58) Field of Classification Search ............... 264/555, 264/557, 562
See application file for complete search history.

(56) References Cited

U.S. PATENT DOCUMENTS

| | | | |
|---|---|---|---|
| 6,093,490 | A | 7/2000 | Meraldi et al. |
| 6,682,677 | B2 | 1/2004 | Lobovsky et al. |
| 6,827,892 | B2 | 12/2004 | Smirnova et al. |
| 6,900,264 | B2 | 5/2005 | Kumar et al. |
| 2002/0113335 | A1 | 8/2002 | Lobovsky et al. |
| 2005/0076809 | A1 | 4/2005 | Mackey et al. |
| 2005/0100501 | A1 | 5/2005 | Veedu et al. |
| 2005/0106391 | A1 | 5/2005 | Lawrence et al. |

*Primary Examiner*—Leo B Tentoni
(74) *Attorney, Agent, or Firm*—Dinsmore & Shohl LLP

(57) ABSTRACT

Methods of fabricating continuous nanofibers include the steps providing a column, flowing an extrusion liquid through the column, and flowing a precursor liquid through the extrusion liquid, wherein the flowing precursor liquid has a viscosity less than the viscosity of the extrusion liquid. The method further includes reducing the diameter of the flowing precursor liquid by extruding the precursor liquid through the extrusion liquid, wherein the diameter of the precursor liquid is reduced by a factor of at least 5, and forming a continuous nanofiber by solidifying the extruded precursor liquid.

11 Claims, 1 Drawing Sheet

FABRICATION OF SMALL DIAMETER CONTINUOUS FIBERS

CROSS-REFERENCE TO RELATED APPLICATIONS

This application is a continuation-in-part of application Ser. No. 11/462,579 filed on Aug. 4, 2006, now abandoned, which claims priority to provisional Application No. 60/705,743, filed on Aug. 5, 2005. The entire contents of both applications are incorporated by reference herein.

FIELD OF THE INVENTION

The present invention relates generally to methods of producing small diameter, continuous fibers, and specifically relates to methods of producing continuous polymer and ceramic nanofibers of arbitrarily long lengths.

BACKGROUND OF THE INVENTION

Fibrous materials, especially nanofibers, are a widely used industrial material, which in recent years have been the subject of numerous research and development efforts. A fiber can be defined as a three-dimensional structure that is much larger in one dimension then the other two. If an arbitrary object can be described by three characteristic length scales, a, b and c, then a fiber is described by a>>b and c. Frequently, a fiber takes the form of a long, cylindrically symmetric strand that has a circular cross-section that does not change significantly along the z-axis. Fibers are manufactured from all major materials classes (polymers, metals, ceramics and glasses) and are utilized in virtually every major industry in some form or another. They can be used in the form of single fibers, felts, textiles, cables, or reinforcing elements in composites, etc.

Fibrous materials provide enhanced flexibility, improved material properties, ultra-high surface area, chemical reactivity, increased strength, and the ability to transfer tensile loads using less material/volume. Despite these benefits, individual fibers are especially susceptible to damage, so they may often be used in combination with other materials. Multiple fibers may be combined to form textiles, metal wires, cables, polymeric cables, ropes, etc. Multiple fibers may also be used in fiber reinforced composites, wherein multiple fibers/textile layers are embedded in another material. This allows assembly of a large object with the properties of a fiber, wherein the surrounding material may provide protection, isolation, etc. Fiber reinforced materials may include fiberglass, carbon reinforced composites, metal and ceramic matrix composites etc.

Current research in the area of fibrous materials is focused on development of fabrication techniques that can produce nanofibers. Currently, nanofibers are produced by chemical synthesis methods, glass-drawing techniques, and modified extrusion strategies. Chemical synthesis methods rely on the controlled growth of a fibrous structure, in a liquid or gas environment, to produce a fiber in an atom-by-atom fashion. These methods are frequently used to produce single crystal whiskers of various inorganic materials, the best known of which is carbon nanotube synthesis. These techniques produce materials with extraordinary properties, but have proven entirely incapable of fabricating a continuous monofilament structure. In fact, short carbon nanotubes grown by these methods are currently being used as a feedstock for the production of continuous fibers via other extrusion-based methods.

Glassdrawing techniques have been utilized to produce continuous nanofibers from a limited selection of inorganic glass and polymer materials. Furthermore, a highly modified extrusion method known as electrospinning is often utilized for fabricating long nanofibers. Electrospinning involves the extrusion of a highly viscous polymer precursor through a relatively large aperture. This occurs simultaneously with the application of high voltage between the aperture and an appropriately positioned collector plate. Electric field effects cause the fluid to form a "Taylor cone" which is essentially a fluid instability at the center of the meniscus. A microscopic jet of precursor material emanates from the Taylor cone and is pulled to the collector plate by the applied electric field. The fluid jet propagates in a pseudo-random fashion, producing stretching and bending motions that further reduce the diameter of the fiber, which is eventually deposited on the collector plate. This process often produces a "nano-felt" material. Efforts to produce truly spoolable, continuous nanofiber with electrospinning focus on modified collection strategies such as spinning mandrels or electrode arrays. This allows the collection of highly aligned nanofibers, but does not produce a nanofiber that can be manipulated as a single continuous strand.

The difficulty of nanofiber production lies primarily in geometrical considerations, and the particularly small scale of the cross sectional features. Accordingly, the present invention is directed to a fiber fabrication method that can reliably produce the necessary nanoscale dimensions, yet allow the fiber length to be extended to arbitrary lengths. As demands increase for continuous nanofibers, the need arises for improved methods of producing these fibers, especially nanofibers having submicron dimensions.

BRIEF DESCRIPTION OF THE DRAWINGS

The following detailed description of the illustrative embodiments of the present invention can be best understood when read in conjunction with the following drawing, where like structure is indicated with like reference numerals and in which.

SUMMARY OF THE INVENTION

Figure 1:
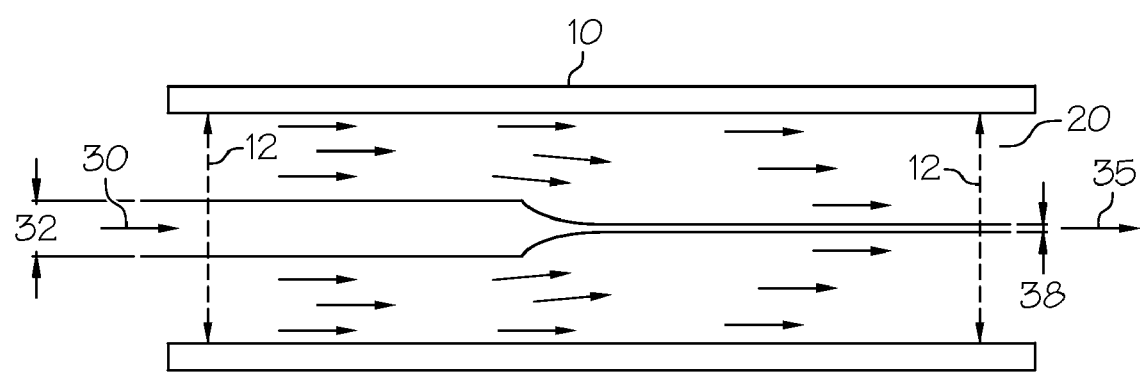
FIG. 1 is schematic view illustrating the method of forming continuous nanofibers according to one or more embodiments of the present invention.

According to a first embodiment of the present invention, a method of fabricating continuous nanofibers is provided. The method includes flowing an extrusion liquid through the column, and flowing a precursor liquid through the extrusion liquid, wherein the flowing precursor liquid has a viscosity less than the viscosity of the extrusion liquid. The method further includes reducing the diameter of the flowing precursor liquid by extruding the precursor liquid through the extrusion liquid, wherein the diameter of the precursor liquid is reduced by a factor of at least 5, and forming a continuous nanofiber by solidifying the extruded precursor liquid.

According to a second embodiment of the present invention, a method of fabricating continuous nanofibers is provided. The method includes providing a column, flowing an extrusion liquid through the column, wherein the extruding liquid defines a viscosity of from about 3,000 to about 15,000 centipoise, and a Reynolds number of from about 0.001 to about 1, and flowing a precursor liquid through the extrusion liquid, wherein the flowing precursor liquid defines a diameter of from about 50 to about 100 µm, a viscosity of from about 1 to about 10 centipoise, and a Reynolds number of from about 0.001 to about 1. The method further includes reducing the diameter of the flowing precursor liquid by extruding the precursor liquid through the extrusion liquid such that the diameter of the precursor liquid is reduced to about 5 μm or less, and forming a continuous nanofiber by solidifying the extruded precursor liquid.

Additional features and advantages provided by embodiments of the present invention will be more fully understood in view of the following detailed description.

DETAILED DESCRIPTION

Referring to FIG. 1, methods and systems of fabricating continuous nanofibers are provided. The method includes providing a column 10 having an aperture 12 of about 100 to about 200 μm. Other aperture 12 sizes are also contemplated herein. In one embodiment, the column 10 comprises a pair of apertures 12 located at opposite ends of the column 10. It is also contemplated that the column 10 may comprise various shapes. In one embodiment, the column 10 defines a cylindrical shape. The column 10 comprises a liquid material 20 flowing in the column 10 and configured to extrude a flowing precursor liquid 30, which is fed to the column 10. The precursor liquid 30 is delivered to the column by various means, for example, injected into the column by a syringe in the form of a liquid droplet.

The precursor 30 defines a viscosity less than the viscosity of the extrusion liquid 20. In one embodiment, the precursor liquid 30 and extrusion liquid 20 may both be characterized as laminar flowing liquids. In a further embodiment, the precursor liquid 20 may have a Reynolds number of about 0.001 to about 10, and the extrusion liquid may have a Reynolds number of from about 0.001 to about 1000, or from about 0.001 to about 10. The precursor liquid 30 may define a viscosity slightly thicker than water, or from about 1 to about 10 centipoise, and the extrusion liquid 20 may define a viscosity of about 10,000 to about 15,000. In a specific embodiment, the extrusion liquid 20 may define a viscosity of from about 3,000 to about 5,000 centipoise.

The extrusion liquid could be composed of nearly any fluid with the appropriate viscosity and Reynolds numbers listed above. For example, and not by way of limitation, the extrusion liquid could include water-based materials, various polar or nonpolar solvents, or combinations thereof. The extrusion liquid may also include a melted plastic or a polymeric fluid. Similarly, the precursor may include any fluid with the appropriate viscosity and Reynolds numbers listed above. These may include, but are not limited to, a dissolved polymer, a melted polymer, a monomer solution, a solution of metallorganic chemicals, or combinations thereof.

After feeding the liquid precursor 30 to the column 10, the precursor liquid 30 is extruded through the higher viscosity extrusion liquid, which reduces the diameter of the flowing precursor liquid 30 by a factor of at least 5. In one embodiment, the precursor liquid 30 entering the column 10 defines a diameter 32 of about 50 to about 100 μm, and after extrusion defines a diameter 38 of below about 10 μm, or in a further embodiment, below about 1 μm. In operation, the precursor 30 is extruded into long, stable liquid jets 35 with a diameter of about 10 μm or less. The highly viscous extrusion liquid 20 stabilizes the extruded precursor 35, maintaining fiber geometry while solidification occurs. Solidification of the extruded precursor 35 results in a continuous nanofiber of variable lengths.

Moreover, solidification occurs before the effects of breakup occur. Under previous wet spinning methods, a low viscosity precursor e.g. a droplet would break inside a high viscosity fluid due to the formation of air bubbles. The air bubbles may be caused by external agitation, surface tension, etc. However, in the present invention, the low viscosity precursor is extruded and stabilized by the high viscosity extrusion liquid, such that the low viscosity precursor reaches very low micron or submicron dimensions before the precursor may be cut off i.e. produce multiple droplets. Thereafter, upon stabilization, the extruded droplet solidifies to produce continuous nanofibers, which is operable to be rolled into a spool. Solidification may occur by various methods known to one or ordinary skill in the art, for example, freezing, solvent evaporation, polymeric cross-linking, or combinations thereof. The method may produce continuous nanofiber, for example, polymers, ceramics, glasses, metals, or combinations thereof. In specific embodiment, the method can be applied to the production of numerous fibers, such as nylon 6,6, polyethylene fibers, ceramic nanofibers, etc.

The dynamics and mechanics of this system, is explained in part by the Raleigh criterion, a well-known limitation of all fluid extrusion processes. The Raleigh criterion (see equation below) balances surface energy with fluid volume conservation, and determines the minimum diameter-to-length ratio of fluid column that can exist with stability in a given system. Any fluid jet with features smaller then a critical diameter will spontaneously decompose (breakup) into spherical droplets. In order to produce small diameter fibers, it is necessary to stabilize or solidify the columnar structure prior to decomposition into spherical droplets. However, this is made more difficult when the aperture size approaches submicron dimensions. Consider the pressure required to propel a fluid with viscosity m at a flow rate of Q, through a pipe of length L and diameter D:

$$\Delta P = \frac{128 \cdot Q \cdot \mu \cdot L}{\pi \cdot D^4}$$

Note that the pressure is inversely proportional to $D^4$, and will rapidly diverge as the aperture approaches submicron dimensions. Thus, relatively low viscosity fluids must be employed in order to extrude materials with nano-scale dimensions. However, this greatly accelerates the process of droplet breakup. There is also a practical lower limit to the speed of the solidification event due to the fact that immediate solidification will result in build-up of solid material at the aperture. The present process overcomes these issues by producing an ultra thin fluid structure and then stabilizing the geometrical structure for a sufficient length of time to allow solidification.

The precursor and the extrusion liquids may include various materials known to one of skill in the art. Below are some examples according to one or more embodiments of the present invention which include various materials operable for use in the present invention. For instance, a low viscosity solution of water may be injected at a controlled flow rate into a moving glycerin column. Flow control is accomplished by a Harvard Apparatus Pump 33 syringe pump. Tailoring the relative flow rates of the water and glycerin allows the generation of a long, stable fluid column with highly controlled diameter. In some embodiments, the filament diameter to needle diameter ratio for the syringe pump may be about 100, and even 1000 or more, thus demonstrating the amount of diameter reduction of the precursor solution.

Furthermore, the fabrication technique of the present invention has been utilized in generating fibers of two technologically important polymer materials, Polyvinyl butyral (PVB) and poly(p-phenylene terephthalamide) (PPPT, known commercially as Kevlar-21®). Polyvinyl butyral is a polymer that is commonly used in fibers, films and coatings. In order to generate fibers of this material, a 5% PVB/95% ethanol solution was injected into a laminar flowing water medium containing a viscosity enhancer (1% Aqualon Natrosol). Dissolution of ethanol into the water/Natrosol was observed to produce a continuous filament.

These fibers are collected in a highly aligned fashion. These fibers are 4-5 μm in diameter, and were fabricated with a 100 micron aperture. They exhibit significant surface roughness, which is most likely due to the large diameter of this fiber. As large diameter fibers solidify, radially nonuniform shrinkage can occur as the ethanol diffuses out of the polymer first from the surface, and then from the interior at a later time. This effect tends to becomes less pronounced with decreasing diameter. Glass micropipettes with tip inner diameters in the range of about 5 to about 10 mm have been utilized to fabricate smaller fibers with diameters of 1 mm and less.

Another experiment comprises a solution of 3% PPPT/97% Concentrated H2SO4, which is similar to the precursor used in the spinning of Kevlar fibers. The fiber fabrication method is capable of producing polymer fibers with ~1 μm diameter or lower. The controlling factor is the ratio between precursor viscosity and that of the surrounding medium.

It is noted that terms like "preferably," "generally", "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" or "about" are utilized herein to represent the inherent degree of uncertainty that may be attributed to any quantitative comparison, value, measurement, or other representation. The terms "substantially" and "about" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of fabricating continuous nanofibers comprising:
    providing a column;
    flowing an extrusion liquid through the column, wherein the extruding liquid defines a viscosity of from about 3,000 to about 15,000 centipoise, and a Reynolds number of from about 0.001 to about 10;
    flowing a precursor liquid through the extrusion liquid, wherein the flowing precursor liquid defines a diameter of from about 50 to about 100 μm, a viscosity of from about 1 to about 10 centipoise, and a Reynolds number of from about 0.001 to about 1;
    reducing the diameter of the flowing precursor liquid by extruding the precursor liquid through the extrusion liquid such that the diameter of the precursor liquid is reduced to about 5 μm or less; and
    forming a continuous nanofiber by solidifying the extruded precursor liquid.

2. A method according to claim 1 wherein the continuous nanofiber comprises a length of up to about 100 meters.

3. A method according to claim 1 further comprising rolling the continuous nanofiber into a spool.

4. A method according to claim 1 wherein the continuous nanofiber has a diameter of from about 1 to about 10 μm.

5. A method according to claim 1 wherein the continuous nanofiber has a diameter of less than about 1 μm.

6. A method according to claim 1 wherein the continuous nanofiber is selected from the group consisting of polymers, ceramics, glasses, metals, and combinations thereof.

7. A method according to claim 1 wherein the extrusion liquid includes a viscosity enhancer.

8. A method according to claim 1 wherein the extrusion liquid comprises a viscosity of from about 3,000 to about 5,000 centipoise.

9. A method according to claim 1 wherein the precursor liquid comprises at least one liquid droplet.

10. A method according to claim 1 wherein the column contains a pair of apertures located at opposite ends.

11. A method according to claim 1 wherein solidification occurs by freezing, solvent evaporation, polymeric cross-linking, or combinations thereof.

* * * * *